United States Patent Office 3,204,095
Patented Aug. 31, 1965

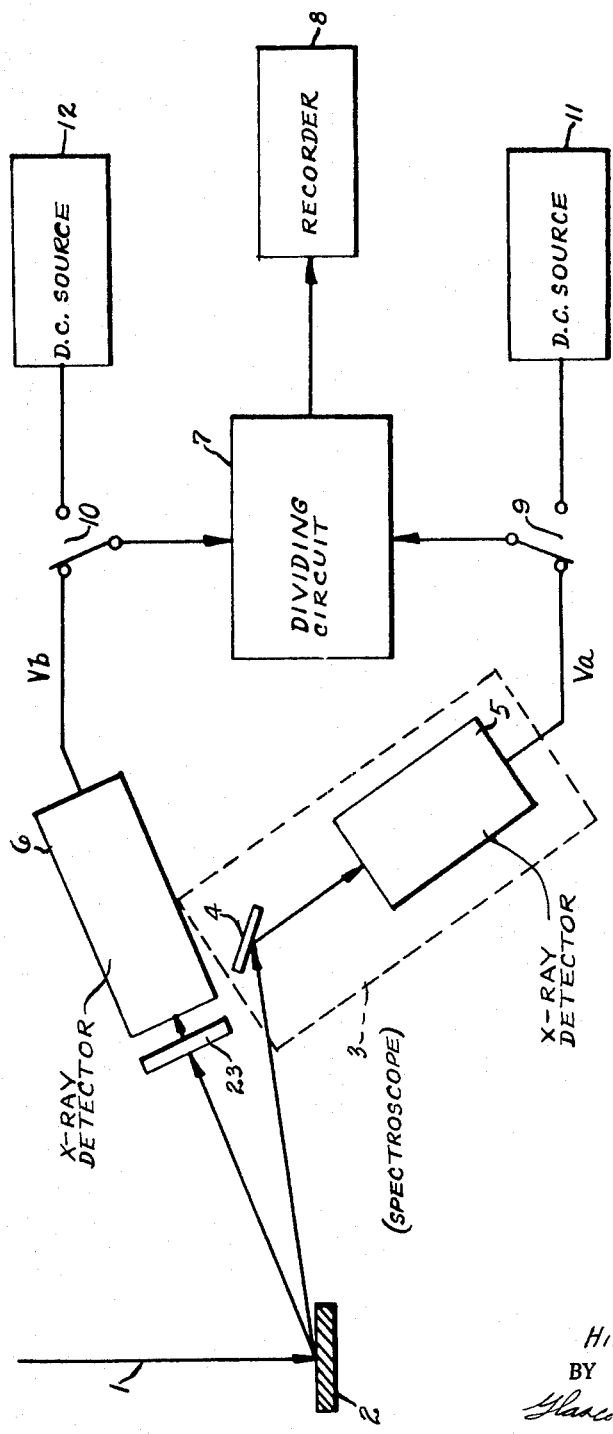

3,204,095
ELECTRON PROBE MICROANALYZER WITH MEANS TO ELIMINATE THE EFFECT OF SURFACE IRREGULARITIES
Hiroshi Watanabe, Tokyo-to, Japan, assignor to Kabushiki Kaisha Hitachi Seisakusho, Tokyo-to, Japan, a joint-stock company of Japan
Filed Dec. 11, 1961, Ser. No. 158,326
Claims priority, application Japan, Dec. 21, 1960, 35/49,460
2 Claims. (Cl. 250—49.5)

This invention relates to X-ray analysis apparatuses and more particularly to a new and improved electron probe micro-analyser for the X-ray emission analysis of a specimen.

When a microportion analysing apparatus by X-rays for carrying out qualitative or quantitative analysis or for examining the distribution of a particular constituent by analyzing the X-rays emitted when a narrow electron beam is projected on a test specimen is to be used for examining the distribution of a particular constituent, an X-ray wavelength spectroscope is so positioned as to detect only the particular constituent, the relative positions of the electron beam and the test specimen are varied, and the intensity of the characteristic X-rays emitted from the aforesaid particular constituent at each instant of variation of relative positions is recorded to indicate the distribution of the particular constituent.

In this case, if the surface of the specimen is not sufficiently smooth, the total energy, that is, the characteristic X-ray energy detected by the X-ray spectroscope, of the X-rays emitted by the projection of the electron beam will vary in accordance with the irregularities of the said surface. Consequently, it will be difficult to determine whether this variation is actually due to variation of the distribution of the particular constituent or whether it is due to the irregularities on the specimen surface as aforementioned. The conventional method of avoiding this difficulty has consisted of examining the irregular condition of the specimen surface by means of an optical microscope, selecting an even spot with the least irregularity, and carrying out analysis thereon. This is an extremely inconvenient method. Furthermore, the conventional method is subject to errors due to factors other than the irregularities of the specimen surface. For example, if fluctuations occur in the power source during analysis, the intensity of the electron beam will accordingly fluctuate and produce results which are easily confused with those due to variations in the distribution of the particular constituent, thereby causing serious errors in the analysis.

It is an object of the present invention to provide a microportion analysing apparatus by X-ray wherein the above mentioned disadvantages are eliminated in a simple manner.

The apparatus of the present invention comprises a means for detecting X-rays of a particular wave length which are emitted through electron beam impact from a position on the surface of a specimen to be analysed, a means for detecting X-rays of a continuous wave length which are emitted from substantially the same position on the specimen in the same or substantially same direction as the X-rays of a particular wave length and a means for comparing the detected intensity of the X-rays of a particular wave length with the detected intensity of the X-rays of a continuous wave length.

Further objects and advantages of the invention will be apparent from the following description taken in conjunction with the accompanying drawing wherein:

The single figure is a schematic diagram illustrating the invention.

Referring to the drawing, the entire apparatus comprises, essentially, an X-ray spectroscope 3 composed of a crystal plate 4 for analysis and an X-ray detector 5 for detecting X-rays of a particular wavelength reflected at the said crystal plate 4; an X-ray detector 6 disposed in a suitable position in the proximity of the aforesaid X-ray spectroscope 3; a division circuit 7; a recorder 8 for recording the output signal of the said division circuit 7; change-over switches 9 and 10 for switching the input signal of the said division circuit 7; and direct-current power sources 11 and 12. A specimen 2 is placed in such a position that a narrow electron beam 1 projected thereon from an electron beam emitting means (not shown) causes X-rays to be emitted from the specimen 2 toward the X-ray detector 6 and the X-ray spectroscope 3.

The X-ray detector 6 is not limited to the detection of a particular wavelength but is capable of detecting X-rays of wavelengths within a required range (continuous X-rays). To accomplish this result a secondary electron filter 23 is provided in the X-ray detector 6 so as to detect precisely only desired X-rays and in this way a much better effect can be obtained. In order to achieve this object it is enough to provide a thin film for shielding or shuttting off secondary electrons and then to compress a proper negative high voltage charge thereon.

The operation of the above-described apparatus in the case of examining the distribution of a particular constituent by slowly moving the specimen 2 in a fixed direction is described below. First, it will be assumed that the surface of the specimen is substantially even, and there are no extreme variations in the distribution of the particular constituent. Then, the total X-ray energy emitted from the specimen 2 will not vary with the movement of the specimen, and the output $V_b$ of the X-ray detector 6 will be constant.

On the other hand, the output $V_a$ of the spectroscope 3 varies in accordance with the distribution of the particular constituent from point to point on the surface of the specimen. Accordingly, by operating the switches 9 and 10 to connect the outputs $V_a$ and $V_b$ to the division circuit 7, the output ratio $V_a/V_b$ is made to indicate the variations of the particular constituent of the specimen, and this is recorded in the recorder 8.

Next, in the case wherein the specimen surface has irregularities, and there are no extreme variations in the distribution of the particular constituent, the emitted X-rays caused to reach the crystal plate 4 of the spectroscope 3 by the movement of the specimen 2 vary in intensity. For example, when the electron beam strikes a depression in the specimen surface, the emitted X-rays are baffled by the surrounding parts, and the X-ray energy reaching the aforesaid crystal plate 4 is reduced. Accordingly, the output $V_a$ of the spectroscope 3 varies, together with the variation of the distribution of the particular constituent, in accordance with the irregularity of the specimen surface. At the same time, however, the variation due to the surface irregulaties of the intensity of the emitted X-rays is detected by the X-ray detector 6 disposed in the proximity of the spectroscope 3, and the variation of its output $V_b$ is in accordance with the irregularities of the specimen surface. Therefore, if the output $V_a$ of the X-ray spectroscope 3 and the output $V_b$ of the X-ray detector 6 are connected, similarly as before, to the division circuit 7, its output will be $V_a/V_b$, wherefore the variations due to the surface irregularities mutually cancel, and only the signal due to the constituent variation will be recorded in the recorder 8. Also, in the case wherein the intensity of the electron beam 1 varies during analysis measurement, the output $V_a/V_b$ similarly varies in accordance with only the constituent variation.

The foregoing description has been presented under the assumption that the particular constituent does not exhibit any extreme variation due to position on the specimen.

However, also in the case wherein there are extreme variations due to position, the variations in the output of the X-ray detector 6 are mostly determined by the accelerating voltage of the electron beam 1. Consequently, the output variations caused by the aforesaid constituent variations are relatively small and do not present any substantial problem. If, however, there is a possibility that these variations cannot be neglected, the change-over switch 10 is switched to connect the direct-current power source 12 to the division circuit 7, in place of the output $V_b$ and recording is carried out, whereby the variation of the output $V_a$ of the spectroscope is recorded, and the operational condition becomes the same as that of the conventional case. When, in place of the output $V_a$, the direct-current power source 11 is connected to the division circuit 7, the variation of 1% $V_b$, that is, only the influence due to the specimen surface irregularities, is recorded.

Since the afore-mentioned X-ray detector 6 for continuous wavelengths is required to detect X-rays exhibiting the same variations as those of the X-rays entering the X-ray wavelength spectroscope 3, it is necessary to position this detector 6 in the very close proximity of the said spectroscope. Accordingly, it is necessary that this detector 6 be of extremely small size, for example, an X-ray detector of photoconductive type wherein is used a photoconductive substance the electric resistance of which is caused to vary by X-ray irradiation thereon. In this case, since the said photoconductive-type, X-ray detector also has high sensitivity with respect to electron beams, as well as to X-rays, it is necessary to provide a film forming a secondary electron filter 23 for shutting off the secondary electrons which are emitted simultaneously with the X-rays from the specimen. Photoconductive-type, X-ray detectors provided with such films for shutting off secondary electrons are available at present in sizes of approximately a few cubic millimeters. Miniature X-ray detectors of this order of size fully meet the requirements for use in the present apparatus as the X-ray detector for continuous wavelengths.

For the division circuit 7, a division circuit of the type ordinarily used in analogue computers is used. An example of such a division circuit is that wherein the output of a high-gain amplifier and an input signal $V_b$ are applied to a multiplier; at the same time, the output signal of the said multiplier and another input signal $V_a$ are applied to the input side of the aforesaid high-gain amplifier; and from the output side thereof an input $-V_a/V_b$ is obtained.

By means of the X-ray analysis of the present invention of the above-described construction and operation, extremely accurate analysis is possible.

Although this invention has been described with respect to a particular embodiment thereof, it is not to be so limited as changes and modifications may be made therein which are within the full intended scope of the invention, as defined by the appended claims.

What is claimed is:

1. An electron probe micro-analyser for the X-ray emission analysis of the specimen, said apparatus comprising means for projecting an electron beam onto a portion of the surface of said specimen to cause the simultaneous emission of X-rays of a characteristic wave length from the element of interest in said specimen and X-rays of a continuous wave length from said specimen, first detector means for detecting said X-rays of a characteristic wave length and producing a signal the intensity of which varies in accordance with the amount of said element in said specimen and with surface irregularities, second detector means for detecting said X-rays of a continuous wave length and producing a signal the intensity of which varies in accordance with surface irregularities, and means for determining the ratio between the signals produced by said first and second detectors to thereby eliminate the effect of surface irregularities and obtain a signal that varies only in accordance with the variation of said element in said specimen.

2. An apparatus as defined in claim 1, in which said means for determining the ratio between said signals comprises a dividing circuit, and means for recording the output of said dividing circuit.

References Cited by the Examiner

UNITED STATES PATENTS

| | | | |
|---|---|---|---|
| 2,418,029 | 3/47 | Hillier | 250—51.5 |
| 2,442,752 | 6/48 | Armstrong | 250—51.5 |
| 2,824,235 | 2/58 | Hahn et al. | 250—43.5 |
| 2,839,678 | 6/58 | DeWitz | 250—83.3 |
| 2,848,624 | 8/58 | Friedman et al. | 250—51.5 |
| 2,926,257 | 2/60 | Friedman | 250—83.3 |
| 3,035,174 | 5/62 | Turner et al. | 250—83.3 |
| 3,100,261 | 8/63 | Bigelow | 250—51.5 |
| 3,103,584 | 9/63 | Shapiro et al. | 250—51.5 |

RALPH G. NILSON, *Primary Examiner.*